United States Patent [19]

Theurer

[11] 4,103,622
[45] Aug. 1, 1978

[54] BALLAST TAMPING MACHINE

[75] Inventor: Josef Theurer, Vienna, Austria

[73] Assignee: Franz Plasser Bahnbaumaschinen m.b.H., Vienna, Austria

[21] Appl. No.: 796,373

[22] Filed: May 12, 1977

[30] Foreign Application Priority Data

Sep. 10, 1976 [AT] Austria .................. 6746/76

[51] Int. Cl.² .......... E01B 27/17; B61F 13/00
[52] U.S. Cl. .................. 104/7 R; 104/12; 105/215 C
[58] Field of Search .......... 104/2, 7 R, 7 A, 7 B, 104/8, 12; 105/215 C; 171/16; 37/104, 105, 106, 107

[56] References Cited

U.S. PATENT DOCUMENTS

| 2,021,075 | 11/1935 | McGinness | 105/215 C |
| 2,889,785 | 6/1959 | Browne | 105/215 C |
| 3,022,744 | 2/1962 | Jackson | 104/12 |
| 3,494,300 | 2/1970 | Anderson et al. | 104/12 |
| 3,905,306 | 9/1975 | Janes | 105/215 C |

*Primary Examiner*—Randolph A. Reese
*Attorney, Agent, or Firm*—Kurt Kelman

[57] ABSTRACT

An on-track, off-track track tamper has a machine frame trailer mounted on a rear and front undercarriage having wheels adapted for engagement with, and mobility on, the track, coupled to a truck tractor mounted on undercarriages supporting the tractor and having wheels for engagement with, and mobility on, the road. The machine frame carries a vertically adjustable lifting and support jack as well as a vertically adjustable undercarriage having wheels adapted for engagement with, and mobility on, the road mounted on the end of the machine frame remote from the tractor.

8 Claims, 3 Drawing Figures

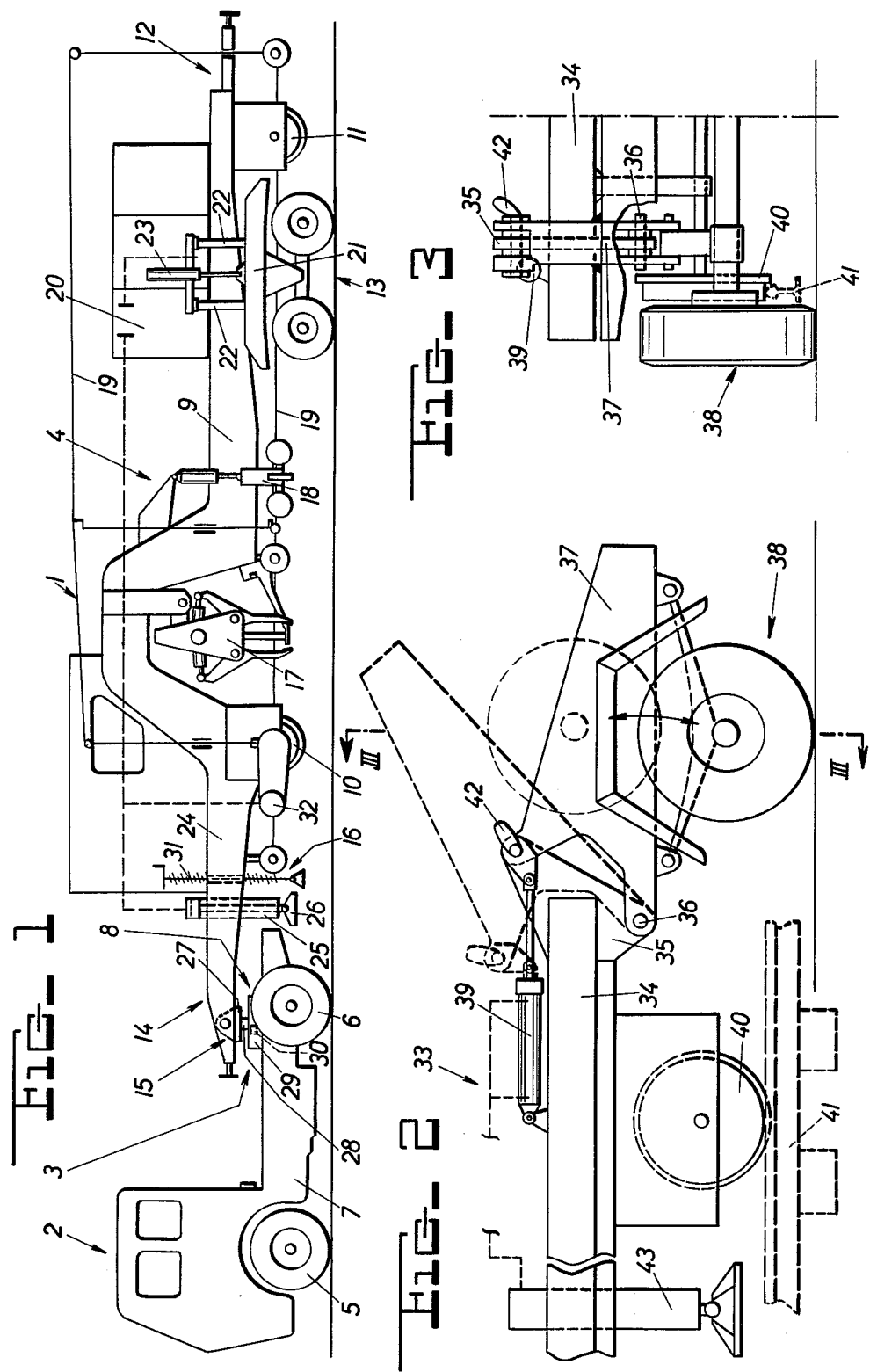

BALLAST TAMPING MACHINE

The present invention relates to a machine for tamping ballast under the ties of a track and adapted for selective movement on a road or on the track.

To enable track tampers to be transported overland from one track working site to another, it has been proposed to provide such machines not only with undercarriages having wheels adapted for engagement with, and mobility on, the track but also with undercarriages having wheels adapted for engagement with, and mobility on, the road, as well as with a drive propelling the machine on the road. In a track tamper of this type disclosed in U.S. Pat. No. 3,494,300, of Feb. 10, 1970, an on-track, off-track tamper has rubber-tired wheels and steel flanged track wheels arranged side-by-side and actuatable selectively into operative positions. The provision of two undercarriages with rubber-tired wheels and drives for moving the machine on the track and/or the highway makes the machine very expensive, in addition to which space difficulties arise because the rubber-tired and steel flanged wheels are mounted in close proximity to avoid lengthening the machine frame unduly. Furthermore, such a machine cannot be used in a track working train and, for all of these reasons, it has failed to find acceptance in the industry.

It is the primary object of this invention to provide an on-track, off-track ballast tamping machine which is simple in construction and operation, highly economical and which may be readily used in a variety of ways, including movement on the road, movement on the track, self-propelled or moved as part of a track working train. The machine also is adapted to various types of tampers including machines wherein the tamping head is mounted between the axles or in an overhanging portion of the frame.

The above and other objects are accomplished in accordance with the invention by coupling the tamper machine frame to a truck tractor. The machine comprises a machine frame carrying a ballast tamping unit and mounted on a rear and front undercarriage having wheels adapted for engagement with, and mobility on, the track. Coupling means couples one of the machine frame ends to a truck tractor supported on undercarriages having wheels adapted for engagement with, and mobility on, the road. A vertically adjustable lifting and support means and a vertically adjustable undercarriage having wheels adapted for engagement with, and mobility on, the road are mounted on the machine frame, and a drive is provided for moving the machine on the road or the track.

Since the machine frame carries only a single off-track undercarriage and requires no drive for moving on the road, the weight of the track tamper is considerably reduced, its structure is simple, various types of track tampers can be readily adapted to this use, and considerable economies are possible because the machine frame trailer is relatively inexpensive and track tractors are usually readily available to railroads.

The above and other objects, advantages and features of the present invention will become more readily apparent from the following detailed description of certain now preferred embodiments thereof, taken in conjunction with the accompanying drawing wherein FIG. 1 is a side elevational view of an on-track, off-track tamping machine in the off-track position and showing one embodiment of this invention;

FIG. 2 is a partial side elevational view showing an end of another embodiment of a track tamping machine frame; and FIG. 3 is an end view in the direction of arrow III of FIG. 2 of one half of the machine frame and undercarriage illustrated in FIG. 2.

Referring now to the drawing and first to FIG. 1, the ballast tamping machine is shown to comprise tractor-trailer 1 consisting of truck tractor 2, trailer 4 constituting the tamping machine proper and coupling means 3 coupling one end 14 of tamping machine frame 9 to the truck tractor. Undercarriages 5 and 6 support truck tractor 2 and have rubber-tired wheels adapted for engagement with, and mobility on, the road. The tractor is self-propelled by drive 7 which is coupled at least to the wheels of undercarriage 6. The coupling means comprises coupling part 8 mounted on the tractor in the region of rear undercarriage 6 and comprised of fifth wheel 29 and coupling lock 30.

When the tamping machine is in operation on a track, it moves to the right, as seen in FIG. 1, i.e. 12 is the front end of the machine frame and 14 is the rear end. Rear undercarriage 10 and front undercarriage 11 mount machine frame 9 and the undercarriages have flanged wheels adapted for engagement with, and mobility on, the track. The coupling means of trailer 4 to tractor 2 comprises landing gear 15 including gliding plate 27 and kingpin 28 mounted at machine frame end 14 for engagement with, and support on, fifth wheels 29. Vertically adjustable lifting and support means 16 for machine frame 9 are shown in FIG. 1 to include screw jack 31 and hydraulic jack 25. Ballast tamping unit 17 is mounted on the machine frame between ends 12 and 14. In the illustrated embodiment, the tamping unit is mounted between rear and front undercarriages 10 and 11, and track lifting and lining unit 18 is also mounted between the two undercarriages. Furthermore, reference system 19 is also mounted on the tamping machine frame for control of the track correction operation. Track tamping, lifting and lining units, with cooperating reference systems, are well known in track maintenance work and the present invention is not concerned with these means.

According to this invention, a vertically adjustable undercarriage having wheels adapted for engagement with, and mobility on, the road is mounted at machine frame end 12. In the embodiment of FIG. 1, this undercarriage is a double-axle truck 13 with rubber-tired wheels mounted on bogie 21. Truck 13 is mounted between rear and front undercarriages 10 and 11 near front undercarriage 11 while frame lifting and support means 16 is mounted on projecting frame part 24 between rear undercarriage 10 and coupling means 3. Bogie 21 of truck 13 is glidably supported on guide columns 22 for vertical movement therealong, the guide columns being supported on machine frame 9, and hydraulic lifting jack 23 is connected to the truck bogie for vertically adjusting the same, the piston rod of the jack being linked to the truck bogie while the jack cylinder is affixed to the machine frame. Central drive 20 is mounted on machine frame 9 and connected to jack 23 and jack 25 for operating the jacks and thus vertically to move lifting and support jack 25 as well as truck 13. Jack 25 comprises shoe 26 pivotally mounted on the outer end of the piston rod of the jack for support of the machine frame when the jack shoe is lowered into contact with the road or ballast bed.

The lifting and support means 16 may be comprised solely of hydraulic jack 25 or screw jacks 31, or both, the screw jacks being mounted at both sides of projecting frame part 24.

The arrangement of the off-track undercarriage between the two on-track undercarriages of the tamping machine frame has the advantage of permitting the machine to be equipped with all parts necessary for track cars without any difficulty while using the tamping machine frame as a trailer enables the construction to be rigid enough in construction for use on the track. Such a trailer tamper can be readily incorporated into a track working train and can be switched from track to road with great speed.

The tractor-trailer described hereinabove operates as follows:

For transport on highways, track tamper trailer 4 is hitched to truck tractor 2, as shown in FIG. 1, when the tractor-trailer runs on the rubber-tired wheels of undercarriages, 5, 6 and 13. When the machine is to be placed on the tracks, for instance at a railroad crossing or a loading track in a railroad yard, where the road surface and track are coplanar, trailer 4 is aligned with the track so that the wheels of on-track undercarriages 10, 11 are in vertical alignment with the track rails. In this position, screw jacks 31 or hydraulic jack 25 is lowered until the jack shoe comes to rest on the ground or on a support beam placed on the ground to protect the same. Subsequently, the jack is operated further to lift projecting frame portion 24 to move kingpin 28 out of fifth wheel 29 so as to uncouple the trailer from the tractor. The tractor is now moved away under its own power provided by drive 7 and central drive 20 is operated to raise jacks 25 and 23 (or only jack 23 while screw jack 31 is mechanically raised) to permit the wheels of undercarriages 10, 11 to engage the track rails.

The illustrated tamping machine trailer is self-propelled and may be moved along the track under its own power, drive 32 being operated from central drive 20. However, the tamping machine frame may also be incorporated into a train or pulled by a railway trolley or a yard locomotive.

When the track tamper is to be removed from the track and transported to another site over highways, the procedure is reversed. The tractor is moved towards frame 9 to enable the frame to be coupled thereto, central drive 20 is operated to lower jack 23 and position the rubber-tired wheels of undercarriage 13 on the ground while causing lifting means 16 to raise the projecting part 24 until the frame is more or less parallel to the ground. The tractor is now backed up to enable coupling means 3 to be engaged by lowering kingpin 28 into fifth wheel 29. Lock 30 is closed and the tractor-trailer is now in condition for movement on its rubber-tired wheels.

In a machine of this type, it is possible to locate the operating cabin of the tamper strictly in accordance with the needs of such a machine and without regard to operation on the road since the road operation is controlled from the cabin of the truck tractor. Furthermore, since the tractor has its own power source, the entire machine can be readily removed even if there should be a power failure in drive 20 of the tamper and this drive is only for operation of the tamper jacks and possible for movement of the trailer alone, thus protecting the central tamper drive from excessive use.

With particular advantage, machine frame 9 takes the form of a centered beam, as more fully described in U.S. patent application Ser. No. 695,734, filed June 14, 1976, now U.S. Pat. No. 4,066,020, with tamping unit 17 and track lifting and lining unit 18 mounted on the beam between the undercarriages. This arrangement makes it possible to mount the track tamping tools, which are aligned transversely, in a relatively narrow space, thus avoiding that the trailer assumes undue width for road transport. At the same time, such an embodiment can be adapted not only for the compact type of tamper, wherein the working tools are mounted between the axles, but also for the so-called overhanging tamper type, wherein the tools are mounted on a frame portion projecting beyond one of the axles. In this case, the center beam need only be extended to provide the overhanging frame portion.

FIGS. 2 and 3 show a particularly simple embodiment of an off-track undercarriage mounted for vertical adjustment on a track tamping machine frame trailer. This embodiment is especially useful for simple and light track tampers, and it has the added advantage that, regardless of the construction of the tamper, the end region of the machine which provides the most space can be used for mounting the coupling means. FIG. 2 shows only one end of frame 34 of tamper trailer 33, the other frame end (not shown) projecting beyond an undercarriage supporting the frame on the track and carrying the coupling means for hitching tamper trailer 33 to a truck tractor, such as tractor 2 shown in FIG. 1. The illustrated frame end is supported on track 41 by the flanged wheels of undercarriage 40. Single-axle off-track truck 38 having rubber-tired wheels is mounted at the one end of frame 34 beyond on-track undercarriage 40. The illustrated mounting comprises bracket 35 affixed to the frame end and horizontal pivot pin 36 extending transversely of the track and pivotally supporting carrier bogie 37 of undercarriage 38 on bracket 35 for vertical adjustment of undercarriage 38 between a road engaging position (shown in full lines) and an inoperative position (shown in broken lines). Hydraulic drive 39 is mounted on machine frame 34 and has a piston rod linked to truck bogie 37 for effecting the pivoting movement.

This embodiment operates as follows:

When the machine is positioned over the track, uncoupled and the tractor is removed, as described hereinabove in connection with the embodiment of FIG. 1, the machine frame is suitably supported on the ballast bed by operation of a jack (not shown in FIG. 2) and drive 39 is then operated to lift truck 38 while the jack support of the tamper frame is simultaneously withdrawn to lower undercarriage 40 into engagement with track 41. The operation is substantially identical with that described in connection with FIG. 1, except that the off-track undercarriage of the tamper machine frame is vertically moved in the embodiment of FIG. 1 while it is pivoted in the embodiment of FIG. 2. Identically, the operating steps are reversed when the track tamper trailer is to be moved off the track, hitched to the tractor and moved overland. As shown in FIG. 3, truck 38 is locked in position by safety bolt 42 passing through a suitable bore in bracket 35.

As shown in FIG. 2, instead of mounting the lifting and support jack for the track tamping machine frame in the region of the coupling means, a turntable 43 may be used for this purpose, such turntables being conventionally used on track tampers to enable them to be turned around for use in either track direction. The turntable is mounted on the tamper frame at the point of gravity between the on-track undercarriages and may incorporate a hydraulic jack used in the manner of the lifting and support means 16 of FIG. 1.

Thus, when the machine is transferred from off-track to on-track operation, turntable 43 is simply lowered into support contact with the ground, off-track truck 38 is pivoted upwards, and the turntable is then withdrawn again to lower on-track undercarriage 40 into support contact with the track. Reversely, the turntable is lowered to support tamper frame 34 while lifting undercarriage 40 out of contact with the track rails, truck 38 is pivoted downwards into support contact with the ground and turntable 43 is lifted again.

The arrangement of the off-track undercarriage beyond a respective on-track undercarriage at the end of the tamper frame is particularly advantageous in tampers with a relatively small distance between its axles or where a great number of working tools are mounted between the axles. In machines where the tamping tools are mounted on a frame portion overhanging one of the axles, this overhanging frame portion may also serve to support the coupling means and the frame lifting and support means. A machine of this type, with a center beam frame, is disclosed, for example, in U.S. application Ser. No. 695,733, filed June 14, 1976 now U.S. Pat. No. 4,069,763.

Obviously, any type of frame lifting and support means and/or means for vertically adjusting the off-track undercarriage of the tamper frame may be used, whether manually or automatically operated. Also, these means may be operated from a central drive on the tamper machine frame and/or from a drive on the tractor, depending on operating conditions. If desired, the tamper trailer or its off-track truck pivotally mounted at its rear end may carry illumination and/or brakes required for road traffic and the control lines for the lights and brakes may be affixed to the tamper frame and then coupled to the tractor for operation when the tractortrailer is moved over roads.

What is claimed is:

1. A machine for tamping ballast under the ties of a track and adapted for selective movement on a road or on the track, comprising
    (a) a machine frame having two ends,
    (b) an undercarriage at each of the machine frame ends, whereon the machine frame is mounted, the undercarriages having wheels adapted for engagement with, and mobility on, the track,
    (c) a truck tractor and undercarriages supporting the truck tractor, the undercarriages of the truck tractor having wheels adapted for engagement with, and mobility on, the road,
    (d) coupling means for coupling one of the machine frame ends to the truck tractor,
    (e) a vertically adjustable lifting and support means for the machine frame,
    (f) a ballast tamping unit mounted on the machine frame between the coupling means and the undercarriage at the other machine frame end,
    (g) a vertically adjustable undercarriage having wheels adapted for engagement with, and mobility on, the road mounted at the other end of the machine frame,
    (h) a drive for vertically adjusting the vertically adjustable undercarriage, and
    (i) a drive for moving the machine.

2. The ballast tamping machine of claim 1, wherein the ballast tamping unit is mounted between the rear and front undercarriages, the machine frame is a centered beam, and the one machine frame end projects beyond the rear undercarriage.

3. The ballast tamping machine of claim 2, further comprising a track lifting and lining unit mounted on the centered beam between the rear and front undercarriages.

4. The ballast tamping machine of claim 1, wherein the vertically adjustable undercarriage is mounted between the rear and front undercarriages near the front undercarriage, the vertically adjustable undercarriage being a double-axle truck.

5. The ballast tamping machine of claim 4, wherein the vertically adjustable lifting and support means is mounted between the rear undercarriage and the coupling means.

6. The ballast tamping machine of claim 1, wherein the vertically adjustable undercarriage is a single-axle truck mounted at one end of the machine frame beyond a respective one of the undercarriages, and further comprising means for pivoting the truck about a horizontal axis extending transversely of the track for vertical adjustment of the truck between a road engaging and an inoperative position.

7. The ballast tamping machine of claim 6, further comprising means for locking the truck in the respective positions.

8. The ballast tamping machine of claim 1, wherein the vertically adjustable lifting and support means is mounted between the rear and front undercarriages.

* * * * *

UNITED STATES PATENT AND TRADEMARK OFFICE
CERTIFICATE OF CORRECTION

PATENT NO. : 4,103,622
DATED : Aug. 1, 1978
INVENTOR(S) : Josef Theurer

It is certified that error appears in the above–identified patent and that said Letters Patent are hereby corrected as shown below:

In the title page, at [73], insert -- -Industrie-gesellschaft-- after "Bahnbaumaschinen"

Signed and Sealed this

Sixteenth Day of January 1979

[SEAL]

Attest:

RUTH C. MASON
Attesting Officer

DONALD W. BANNER
Commissioner of Patents and Trademarks